May 17, 1966  J. L. SIEGFRIED  3,252,076
ALTERNATING CURRENT DYNAMOELECTRIC MACHINE
Filed April 15, 1963

INVENTOR
JACK L. SIEGFRIED,
BY
Walter R. Thiel
ATTORNEY.

United States Patent Office 3,252,076
Patented May 17, 1966

3,252,076
ALTERNATING CURRENT DYNAMOELECTRIC MACHINE
Jack L. Siegfried, Los Angeles, Calif., assignor to Hughes Aircraft Company, Culver City, Calif., a corporation of Delaware
Filed Apr. 15, 1963, Ser. No. 273,075
4 Claims. (Cl. 322—49)

The present invention relates to alternating current dynamo-electric machines and more particularly to alternators of the brushless type.

Heretofore synchronous alternating current machines or alternators of the brushless type have utilized a rotating rectifier assembly mounted on the same shaft as the rotating field winding to transform the alternating current signal developed by the exciter to the direct current signal for the rotating field winding. While this configuration has greatly minimized the problems of wear, maintenance, and electrical noise prevalent in nonbrushless alternators it still requires a relatively large, bulky structure.

Therefore, an object of the present invention is to provide and improved alternator of the brushless type which eliminates the large, bulky rectifier assembly.

Another object of the present invention is to provide an improved alternator of the brushless type which incorporates, for excitation and regulation, a two-part rotor structure instead of a rotating rectifier assembly.

Briefly, the improved alternator of the present invention includes a driven rotor having a first high remanence portion having multiple pole faces and a second portion magnetically shielded from the first portion and including a section of low remanence material for each pole piece of the first portion. Each of said sections is magnetically shielded from the other sections. In juxtaposition to said rotor, for magnetic coupling thereto, are the alternator and exciter stators which are electrically coupled through a voltage regulator.

Other advantages of the invention will hereinafter become more fully apparent from the following description of the drawings which illustrate two embodiments of the present invention, and in which.

Figure 3:
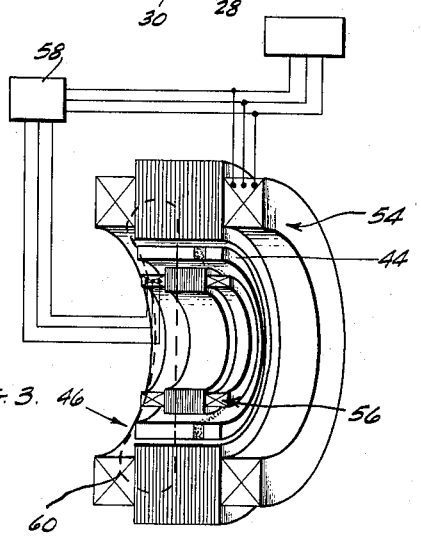
Figure 4:
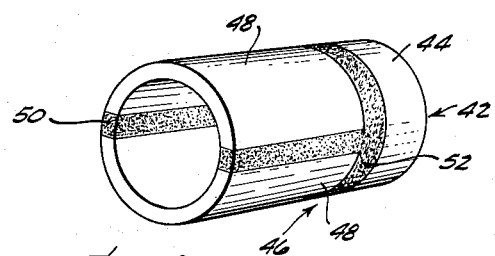

FIG. 3 is a median sectional perspective view of a schematic representation of a second embodiment of an alternator provided in accordance with the present invention illustrating the pancake arrangement of the stators and the driven rotor containing the field structure; and FIG. 4 is a perspective view of the driven rotor of the second embodiment illustrating the magnetic insulation of the permanent magnet pole portion and the excitable portion.

For clarity, the two embodiments of the present invention are depicted in the drawings in a schematic and abbreviated form. Mechanical elements, such as a frame or housing, brackets and other mounting devices have been omitted; however, it should be understood that the complete structure for the alternator provided in accordance with the present invention will contain such elements.

Figure 1:
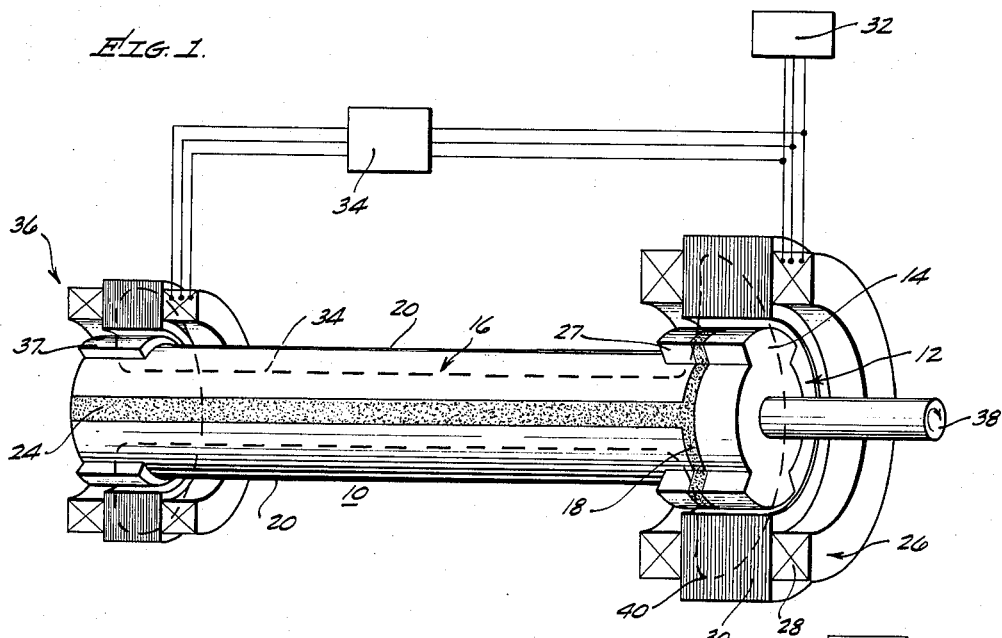
FIGURE 1 is a median sectional perspective view of a schematic representation of a first embodiment of an alternator provided in accordance with the present invention illustrating the arrangement of the stators, and the driven rotor containing the field structure.
Figure 2:
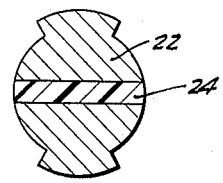
FIG. 2 is a front elevational view of the driven rotor of the first embodiment as viewed from the left of FIG. 1 illustrating the magnetic insulation of the exciter rotor pole portion.

Referring to FIGS. 1 and 2 the first embodiment of the alternator includes a rotor 10 having a first portion 12 having a residual magnetic charge of a high remanence permanent magnet material such as an aluminum nickel cobalt alloy typically of the ALNIC–V type and including a multiple of pole faces 14 and a second portion 16 magnetically shielded from said first portion 12 by a disk 18 of shielding material such as brass or a suitable plastic. The second portion 16 includes an elongated section 20 having a generally semicircular cross section 22 of a low remanence high reluctance material such as soft iron for each pole face of the first section 12 and a multiple of pole faces at its extremities similar in number and orientation as the pole faces 14 of the first portion 12. To specifically orient the magnetic lines of flux through the rotor 10 each of the sections 20 is magnetically shielded from the other sections by a strip 24 of shielding material similar to that of the disk 18 which may be part of the disk 18 or bonded to it.

A first stator 26 circumscribes the pole faces 14 of the first portion and the pole faces of a first extremity 27 of the second portion 16 and includes a laminated core 30 of any suitable or usual construction and a conventional alternating current armature windings 28 which are typically multiphase. The output signal from the windings 28 is electrically coupled to a suitable electrical terminal 32 and through a conventional voltage regulator of the carbon pile or magnetic amplifier type to a second stator 36 which circumscribes the pole faces of a second extremity 37 of the second portion 16. The second stator 36 is wound in the same manner as the stators for a conventional synchronous motor and includes the same number of poles as the first stator 26. For rotation the rotor 10 is mounted by any conventional manner such as welding to a shaft 38 which is driven by a conventional mechanical or electrical prime mover (not shown) such as an internal combustion engine for an electric motor.

Therefore, as illustrated in FIG. 1 by a dotted line 40 the opposite pole pieces on the same extremity of the adjacent sections 20 are coupled by the magnetic lines of force or flux only through the laminated core of each of the stators and the elongated portion of each of the sections. Thus, since the first portion 14 contains a residual magnetic charge any rotation of the shaft 38 causes a rotating magnetic field in the core 30 and develops a multiphase alternating current signal in the windings 28. This signal is sensed by the regulator 34 which in turn supplies it to the windings of the second stator 36 producing a magnetic field in the second portion 16 which is synchronized with the rotating field of the first stator 26 to enhance this field and corresponding the signal developed in the winding 28. As long as a field signal is supplied to the windings of the second stator 36 increased magnetic coupling will exist, because of the magnetic lines of force 40, between the second portion 16 and the first stator 26 which will assist in regulating the alternator output. Thus until the regulator 34 senses the desired signal the increased magnetic coupling will enhance the magnetic field of the first stator 26 and will increase the signal generated in the windings 28.

Referring now to FIGS. 3 and 4 there is shown a second embodiment of the present invention which is similar to the first embodiment in operation and structure except that the stators and rotor are arranged in a generally flat or pancake configuration. The second embodiment includes a rotor 42 having a generally cylindrical shape including a first cylindrical shaped portion 44 having a residual magnetic charge of a high remanence material having a multiple of pole faces and a second portion 46 having arc shaped sections 48 of low remanence material of like number of poles and arrangement thereof as the first portion 44. To achieve the desired magnetic path the sections are shielded from each other by a strip 50 of conventional shielding material and from the first portion 44 by a ring 52 of the same shielding material. The rotor 42 is inscribed within a first stator 54 of similar construction as that of the first stator 26 of the first embodiment and circumscribes a second stator 56 also of similar construction as the second stator 36 of the first embodiment. Both of the stators are electrically coupled through a regulator 58. As illustrated in FIG. 3 by a dotted line 60 the opposite pole pieces of the second portion 46 are coupled by the magnetic lines of force only through the laminated cores of each of the stators. Therefore, a magnetic path exists between the second portion 46 and the first stator 54 which assists in regulating the alternator output.

While two embodiments of this invention have been illustrated it will be appreciated by those skilled in the art that variations in the disclosed arrangements both as to their details and as to the organization of such details may be made without departing from the spirit and scope thereof. Accordingly, it is intended that the foregoing disclosure and the showings made in the drawings shall be considered only as illustrative of the principles of this invention and not construed in a limiting sense.

I claim as my invention:

1. A brushless alternator comprising:
    a driven member including a first high remanence portion having multiple pole faces and a second portion magnetically shielded from said first portion having a section of low remanence high reluctance material for each pole face of said first portion, said sections being magnetically shielded from the other sections and having similarly positioned pole faces as said first portion;
    first and second stator members in juxtaposition to said driven member each including a laminated core and multiphase alternating current windings; and
    a regulating means electrically coupled between the windings of said first and second stator members for sensing the signal developed in the windings of the first stator member and for regulating and supplying a signal to the windings of the second stator member.

2. A brushless alternator comprising:
    a shaft;
    a rotor member mounted on said shaft including a first high remanence portion having multiple pole faces and a second portion magnetically shielded from said first portion having a section of low remanence high reluctance material for each pole face of said first portion, said sections being magnetically shielded from the other sections and having similarly positioned pole faces as said first portion;
    first and second stator members in juxtaposition to said rotor member each including a laminated core and multiphase alternating current windings;
    a regulating means electrically coupled between the windings of said first and second stator members for sensing the signal developed in the windings of the first stator member and for regulating and supplying a signal to the windings of the second stator member; and
    a prime mover coupled to said shaft to produce rotations thereof.

3. A brushless alternator comprising:
    a driven rotor including a cylinder of a high remanence material having multiple pole faces and an arc shaped section of low remanence high reluctance material for each pole face of said cylinder, said sections being magnetically shielded from said cylinder and from the other sections and having similarly positioned pole faces as said cylinder;
    first and second stator members in juxtaposition to said rotor each including a laminated core and multiphase alternating current windings; and
    a regulating means electrically coupled between the windings of said first and second stator members for sensing the signal developed in the windings of the first stator member and for regulating and supplying a signal to the windings of the second stator member.

4. A brushless alternator comprising:
    a shaft;
    a rotor mounted to said shaft and including a cylinder of high remanence material having multiple pole faces and an arc shaped section of low remanence high reluctance material for each pole face of said cylinder, said sections being magnetically shielded from said cylinder and from the other sections and having similarly positioned pole faces as said cylinder;
    first and second stator members in juxtaposition to said rotor each including a laminated core and multiphase alternating current windings;
    a regulating means electrically coupled between the windings of said first and second stator members for sensing the signal developed in the windings of the first stator member and for regulating and supplying a signal to the windings of the second stator member; and
    a prime mover coupled to said rotor to produce rotation thereof.

No references cited.

MILTON O. HIRSHFIELD, *Primary Examiner.*

J. J. SWARTZ, *Assistant Examiner.*